Figure 1:
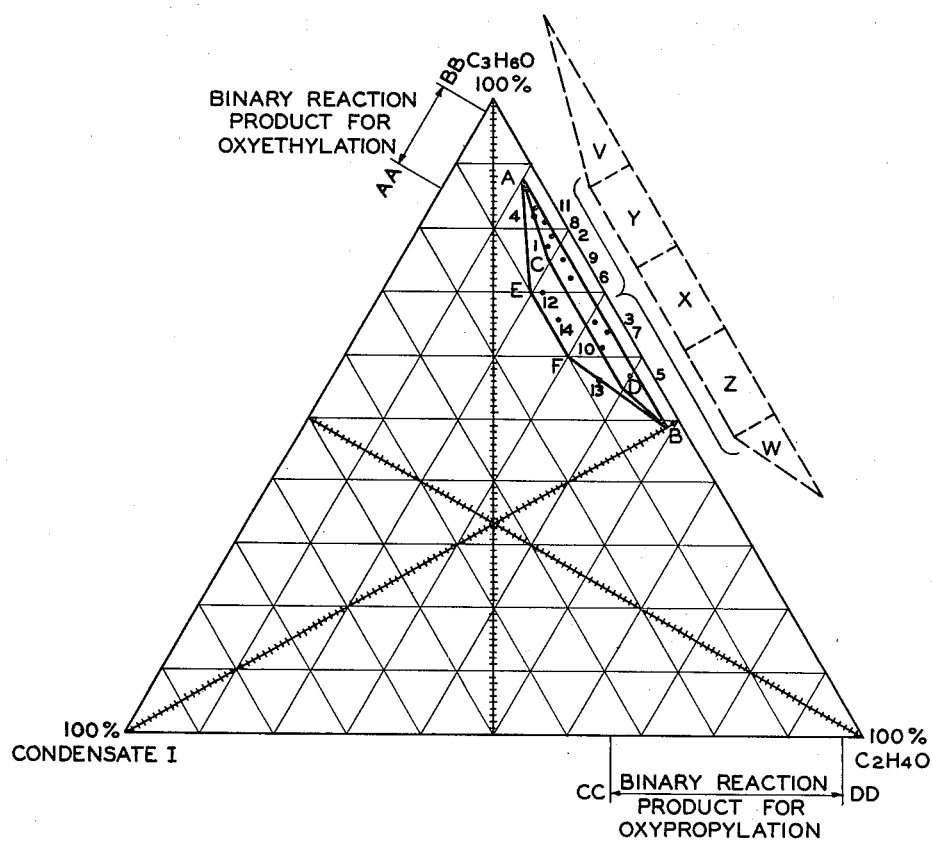

June 1, 1965

M. DE GROOTE ETAL 3,186,951

OXYALKYLATED CONDENSATES

Original Filed May 8, 1958

2 Sheets-Sheet 1

MELVIN DE GROOTE
KWAN-TING SHEN
INVENTORS

BY *Sidney B. Ping*
ATTORNEY

June 1, 1965

M. DE GROOTE ETAL 3,186,951

OXYALKYLATED CONDENSATES

Original Filed May 8, 1958

2 Sheets-Sheet 2

MELVIN DE GROOTE
KWAN-TING SHEN
INVENTORS

BY *Sidney B. Ring*
ATTORNEY

United States Patent Office 3,186,951
Patented June 1, 1965

3,186,951
OXYALKYLATED CONDENSATES
Melvin De Groote, University City, and Kwan-Ting Shen, Brentwood, Mo., assignors to Petrolite Corporation, Wilmington, Del., a corporation of Delaware
Original application May 8, 1958, Ser. No. 734,000, now Patent No. 3,128,314, dated Apr. 7, 1964. Divided and this application May 16, 1960, Ser. No. 29,405
6 Claims. (Cl. 252—331)

This application is a division of Serial No. 734,000 filed May 8, 1958, now U.S. Patent No. 3,128,314, issued April 7, 1964.

This invention relates to oxyalkylated hydrocarbon carbohydrate condensates prepared by reacting an oxyalkylation agent with a condensate of a hydrocarbon with a carbohydrate and materials closely related to carbohydrates (also referred to as "condensates"), particularly those condensates formed by reacting said carbohydrates with a hydrocarbon in the presence of a Friedel-Crafts catalyst, preferably hydrogen fluoride. More particularly this invention relates to oxyalkylated hydrocarbon-carbohydrate condensates prepared by treating an oxyalkylation agent with a condensate of a hydrocarbon and a simple sugar, their desoxy and omega-carboxy derivatives, compound sugars or oligosaccharides and polysaccharides, particularly those formed by reacting said sugars with an aromatic hydrocarbon in the presence of a Friedel-Crafts catalyst, preferably hydrogen fluoride. This invention also relates to process or procedures for employing these condensates for preventing, breaking or resolving emulsions of the water-in-oil type, and particularly petroleum emulsions as well as in various other arts and industries.

More specifically, the present invention is concerned with oxyalkylated condensates derived from the condensates, propylene oxide and ethylene oxide in such weight proportions so the average composition in terms of initial reactants lies approximately within the trapezoid of the accompanying FIG. I of which the minimum condensate content is at least 1.75% and which trapezoid is identified by the fact that its area lies within the straight lines connecting A, B, F, E. Our preference is to use the compositions which represent less than one-half of this total area, to wit, the smaller trapezoid A, B, D, C.

It is immaterial as to whether one reacts the condensates with propylene oxide first and then with ethylene oxide, or with ethylene oxide and then with propylene oxide; or for that matter, one may employ a mixture of the two oxides; or, if desired, one may add a small amount of ethylene oxide, then propylene oxide, and then more ethylene oxide.

Referring to the hereto attached FIG. I, it is simplified by noting that one may react the condensate with enough ethylene oxide so the binary reaction product falls within the mixture identified by the line CC—DD on the extremity of the graph which shows combinations derived solely from the condensate and ethylene oxide. After obtaining such binary reaction product it can then be reacted with propylene oxide so as to bring it within the area of the trapezoid A, B, F, E, or preferably within the smaller trapezoid A, B, D, C.

Similarly, one can produce a binary reaction product from the condensate and propylene oxide as identified by the comparable line AA—BB and subject this reaction product to oxyethylation so as to bring the composition within the area of the trapezoid and preferably within the area of the small trapezoid A, B, D, C.

Another advantageous aspect of the present invention is concerned with oxyalkylated condensates derived from the condensates, ethylene oxide and butylene oxide in such weight proportions so the average composition of said cogeneric mixture stated in terms of initial reactants lies approximately within the 5-sided figure of accompanying FIGURE II in which the minimum condensate content is at least 1.75% and which 5-sided figure is identified by the fact that it lies within the straight lines connecting A', B', C', D', and H'. Here again, it is also immaterial whether one adds butylene oxide first and then ethylene oxide or vice versa.

This invention also relates to the use of the above composition in breaking petroleum emulsions.

HYDROCARBON-CARBOHYDRATE CONDENSATES

The oxyalkylated products of this invention are prepared from water insoluble condensation products and also water soluble condensation products formed by reacting hydrocarbons with carbohydrates and related substances in the presence of a hydrogen fluoride catalyst. These condensation reactions may be carried out in steel equipment or other suitable apparatus lined with silver, copper, and certain alloys such as Monel metal and the like. This treatment may be effected at temperatures of from about −40° to about 100° C., and preferably at temperatures of from about −10 to about +50° C. The pressure at which the reaction is carried out will vary with the reaction temperature used, the mol fractions of reactants and hydrogen fluoride catalyst present, and the volume of the particular reactor utilized. While many of the condensation reactions are carried out at substantially atmospheric pressure, it may be desirable in certain instances and with certain reactants to carry out the the reaction at pressures up to 100 atmospheres or more. It is convenient in most instances to operate the equipment utilized at the pressure generated by the reaction mixture and the catalyst contained therein.

Hydrocarbons which may be used as starting materials in preparing the condensates include isoalkanes or isoparaffinic hydrocarbons, alkenes or olefinic hydrocarbons, alkynes or acetylenic hydrocarbons, alkadienes, aromatic hydrocarbons, hydrocarbons with condensed benzene rings, cyclanes or cycloparaffinic hydrocarbons and terpenes.

Typical utilizable alkanes include isobutane, 2-methylbutane, 2,3-dimethylpropane, 2-methylpentane, 3-methylpentane, 2,3-dimethylbutane, 2-methylhexane, 3-methylhexane, 2,3-dimethylpentane, 2,4-dimethylpentane, 2,2,3-trimethylbutane, 2-methylheptane, 3-methylheptane, 4-methylheptane, 2,3-dimethylhexane, 2,4-dimethylhexane, 2,5 - dimethylhexane, 2,2,3-trimethylpentane, 2,2,4-trimethylpentane, 2,3,3-trimethylpentane, isononanes, isodecanes, isoundecanes, isododecanes, etc.

Suitable utilizable alkene hydrocarbons include ethylene, propylene, 1-butene, 2-butene, isobutylene, pentenes, hexenes, heptenes, octenes, nonenes, decenes, undecenes, dodecenes, etc. High molecular weight polyolefinic hydrocarbons such as those recovered from hydrogen fluoride catalysts used to catalyze the polymerization of olefins, or to catalyze the alkylation of isoparaffinic hydrocarbons with olefins, are also utilizable in the process of the present invention.

Utilizable alkyne hyrocarbons include acetylene, methyl-acetylene, ethylacetylene, propylacetylene, butylacetylene, etc., dimethylacetylene, methylethylacetylene, diethylacetylene, ethyl-propylacetylene, etc. These acetylenic hydrocarbons may also contain aryl and alkaryl substituents such as phenylacetylene, tolylacetylene, etc.

Suitable utilizable alkadiene hydrocarbons include propadiene or allene, derivatives of allene, butadiene, 2-methylbutadiene or isoprene, etc.

Suitable utilizable aromatic hydrocarbons include benzene, toluene, o-xylene, m-xylene, p-xylene, ethylbenzene, 1,2,3 - trimethylbenzene, 1,2,4 - trimethylbenzene, 1,3,5- trimethylbenzene or mesitylene, ortho - ethyltoluene, metaethyltoluene, p-ethyltoluene, n-propyl-benzene, isopropylbenzene or cumene, etc. Higher molecular weight alkyl-aromatic hydrocarbons are also suitable such as those produced by the alkylation of aromatic hydrocarbons with olefinic polymers. Such products are referred to in the art as alkylate, and include hexylbenzene, hexyltoluene, nonylbenzene, nonyltoluene, dodecylbenzene, dodecyltoluene, etc. Very often alkylate is obtained as a high boiling fraction in which case the alkyl group attached to the aromatic hydrocarbon varies in size from $C_9$ to $C_{13}$.

Other suitable utlizable aromatic hydrocarbons include those containing an unsaturated side chain such as styrene, vinyl-toluene, etc.

Other suitable utilizable aromatic hydrocarbons include those with two or more aryl groups such as diphenyl, diphenylmethane, triphenylmethane, fluorene, stilbene, etc. Examples of suitable utilizable hydrocarbons which contain condensed benzene rings include naphthalene, anthracene, phenanthrene, naphtharene, rubrene etc.

In addition, aromatic hydrocarbon derivatives which may be used as starting materials in preparing the condensate include aromatic nitro compounds, aromatic sulfonic acids, aromatic amines, phenols, aromatic halogen compounds, aromatic carboxylic acids, aromatic aldehyde and aromatic ketones.

Typical utilizable aromatic nitro compounds include nitro-benzene, ortho-dinitrobenzene, meta-dinitrobenzene, p-dinitro-benzene, 1,3,5-trinitrobenzene, o-nitrotoluene, m-nitrotoluene, p-nitrotoluene, 2,4-dinitrotoluene, 2,4,6-trinitrotoluene, 2,4,6-trinitro-m-xylene, picric acid, 2,4,6-trinitroresorcinol, tetryl, o-nitrochlorobenzene, m-nitrochlorobenzene, p-nitrochlorobenzene, 2,4-dinitrochlorobenzene, picryl chloride, o-nitro-diphenyl, p-nitrodiphenyl, etc. Certain of the reduction products of aromatic nitro compounds are also utilizable in the process of this invention. Such intermediate reduction products include nitrosobenzene, phenyl-hydroxyl amine, azoxybenzene, azobenzene, hydrazobenzene, etc.

Suitable utilizable aromatic sulfonic acids include benzene sulfonic acid, o-tolyl sulfonic acid, m-tolyl sulfonic acid, p-tolyl sulfonic acid, various xylene sulfonic acids, dodecylbenzene sulfonic acids, dodecyl toluene sulfonic acids, etc. Acid chlorides formed by the reaction of aromatic acids with phosphorus halides are also utilizable. The esters, sulfonamides, and chloroamides formed from aromatic sulfonic acids may also be used as well as nitriles, and sulfinic acids.

Utilizable aromatic amines include aniline, methylaniline, dimethylaniline, diethylaniline, o-toluidine, m-toludidine, p-toluidine, o-nitroaniline, m-nitroaniline, p-nitroaniline, 2,4-dinitroaniline, o-phenylene diamine, m-phenylene diamine, p-phenylene diamine, o-anisidine, p-anisidine, p-phenetidine, o-chloroaniline, m-chloroaniline, p-chloroaniline, p-bromoaniline, 2,4,6-trichloroaniline, 2,4,6 - tribromoaniline, diphenylamine, triphenylamine, benzylidine, o-tolidine, o-dianisidine, etc. The acid salts and acetyl derivatives of the various aromatic amines may also be utilized.

Typical utilizable hydroxy aromatic hydrocarbons include phenol, o-cresol, m-cresol, p-cresol, o-chlorophenol, p-chlorophenol, m-chlorophenol, p-bromophenol, 2,4,6-trichlorophenol, 2,4,6-tribromophenol, o-nitrophenol, m-nitrophenol, p-nitrophenol, 2,4-dinitrophenol, guaiacol anol, eugenol, isoeugenol, saligenin, carvacrol, thymol, o-hydroxyacetophenone, p-hydroxyacetophenone, o-hydroxydiphenyl, p-hydroxydiphenyl, o-cyclohexylphenol, p-cyclohexylphenol, catechol, resorcinol, hydroquinone, pyrogallol, hydroxy-hydroquinone, phloroglucinol, o-aminophenol, m-aminophenol, p-aminophenol, etc.

Aromatic halogen compounds utilizable in the scope of this invention include fluorobenzene, chlorobenzene, bromobenzene, iodobenzene, o-chlorotoluene, m-chlorotoluene, p-chlorotoluene, o-bromotoluene, m-bromotoluene, p-bromotoluene, o-bromo-anisole, p-bromo-dimethylaniline, o - dichlorobenzene, p - dichlorobenzene, 1,2,4 - trichlorobenzene, 1,2,3,4 - tetrachlorobenzene, 1,2,4,5-tetrachlorobenzene, hexachlorobenzene, p-dibromobenzene, o-bromo-chlorobenzene, p - bromo-chlorobenzene, o-bromo-iodobenzene, p-bromo-iodobenzene, p-chloro-iodobenzene, etc.

Utilizable aromatic carboxylic acids include benzoic acid, o-toluic acid, m-toluic acid, p-toluic acid, o-chlorobenzoic acid, m-chlorobenzoic acid, p-chlorobenzoic acid, o-bromobenzoic acid, m-bromobenzoic acid, p-bromobenzoic acid, o-nitrobenzoic acid, m-nitrobenzoic acid, -p-nitrobenzoic acid, 3,5-dinitrobenzoic acid, salicylic acid, m-hydroxybenzoic acid, p-hydroxybenzoic acid, anisic acid, gallic acid, phthalic acid, syringic acid, anthranilic acid, m-aminobenzoic acid, p-aminobenzoic acid, etc. Utilizable derivatives of benzoic acid include methylbenzoate, benzoic anhydride, benzoyl chloride, perbenzoic acid, dibenzoyl peroxide, benzamide, benzanilide, benzhydrazide, etc. Utilizable polybasic acids and derivatives include phthalic acid, phthalic anhydride, isophthalic acid, terephthalic acid, hemellitic acid, trimellitic acid, trimesic acid, prehnitic acid, mellophanic acid, pyromellitic acid, benzene pentacarboxylic acid, mellitic acid, diphenic acid, etc. Also, benzene derivatives with acidic side chain may be used; for example, phenyl acetic acid, hydrocinnamic acid, omega-phenylbutyric acid, delta-phenyl-n-valeric acid, omega-phenyl-n-caproic acid, cinnamic acid, phenylpropionic acid, homophthalic acid, o-phenylene-diacetic acid, m-phenylenediacetic acid, p-phenylene-diacetic acid, o-phenylene-acetic-B-propionic acid, etc.

Utilizable aromatic aldehydes and ketones include benzaldehyde, m-tolualdehyde, p-tolualdehyde, o-chlorobenzaldehyde, p - chlorobenzaldehyde, o - nitrobenzaldehyde, m-nitrobenzaldheyde, p-nitrobenzaldehyde, o-aminobenzaldehyde, p - aminobenzaldehyde, salicylaldehyde, m-hydroxybenzaldehyde, p-hydroxybenzaldehyde, o-methoxybenzaldehyde, anisaldehyde, p-dimethylaminobenzaldehyde, 2,6-dichlorobenzaldehyde, vanillin, acetophenone, propiophenone, benzophenone, fluoroacetophenone, p-dimethylaminobenzophenone, etc.

Suitable utilizable cycloalkane hydrocarbons include alkylcycloalkanes such as methylcyclopropane, methylcyclobutane, methylcyclopentane, methylcyclohexane, etc., aryl substituted cycloalkanes, such as phenylcyclopentane, phenylcyclohexane, etc. Derivatives of cycloalkanes formed by the loss of one molecule of hydrogen to produce cycloalkenes or cycloalkanes containing an unsaturated side chain are also within the scope of the present invention, as are diolefinic cycloalkanes such as cyclopentadiene, etc.

Suitable utilizable terpenic hydrocarbons include menthane, limonene, thujane, carane, pinane, camphane, sabinene, carene, alpha-pinene, beta-pinene, etc.

Carbohydrates which are condensed with hydrocarbons include simple sugars, their desoxy and omega-carboxy derivatives, compound sugars or oligosaccharides, and polysaccharides. Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, i.e., polyuronides, polysaccharides comprised of aldose (pentose or hexose) and uronic acid units, polysaccharides containing hexose units esterified with an inorganic acid, and polysaccharides containing amino sugar units.

Utilizable simple sugars include the diose, glycoaldehyde, trioses, such as glyceraldehyde and s-dihydroxyacetone, tetroses, such as erythrose, threose, erythrulose, and apiose; the pentoses such as arabinose, xylose, ribose, lyxose, rhamnose (a desoxyhexose), fucose (a desoxyhexose), rhodeose, digitalose, and ketoxylose; the hexoses, such as mannose, glucose, idose, gulose, gallactose, talose, allose, altrose, fructose, sorbose, tagatose, and psicose; heptoses such as glucoheptose, manneheptose, galactohextose, sedoheptose, mannoketoheptose, glucoheptulose, and perseulose; octoses such as glucooctose, mannooctose, and gallactooctose; nonoses such as glucononose, and mannononose; and decoses such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxypyruvic acid, a,y-dihydroxyacetoacetic acid, threuronic acid, 4-keto-2,3,5, trihydroxypentanoic acid, xyluronic acid, 5-keto-hexanoic acids such as 5-keto-allonic acid, 5-keto-gluconic acid, 5-ketomannonic acid, 5-ketogulonic acid, and 5-keto-gallactonic acid, uronic acids such as glucuronic acid, mannuronic acid and gallacturonic acid, and the 6-ketoheptanoic acids. The simple sugars and their omega-carboxy derivatives, as starting materials for the process of this invention, may be represented by the following general formula:

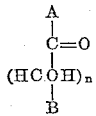

in which A=H and CH$_2$OH, $n$=an integer from 1 to about 12 or so, and B=H, CH$_2$OH, and COOH. As an example of the utility of this general formula when A=H, $n$=1, and B=H, the compound is glycolaldehyde; when A=H, $n$=1, and B=CH$_2$OH, the compound is glyceraldehyde; when A=H, $n$=1 and B=COOH, the compound is tartaronic semialdehyde, a tautomer of hydroxypyruvic acid; when A=CH$_2$OH, $n$=1, and B=H, the compound is s-dihydroxyacetone; when A=CH$_2$OH, $n$=1, and B=CH$_2$OH, the compound is erythrulose; when

$n$=1, and B=COOH, the compound is a,y-dihydroxyacetic acid; when A=H, $n$=2, and B=CH$_2$OH, the compound is threuronic acid; when A=CH$_2$OH, $n$=2, and B=CH$_2$OH, the compound is riboketose, or xyloketose; when A=CH$_2$OH, $n$=2, and B=COOH, the compound is 4-keto-2,3,5-trihydroxypentanoic acid; when A=H, $n$=3, and B=CH$_2$OH, the compound is ribose, arabinose, xylose, or lyxose; when A=H, $n$=3, and B=COOH, the compound is xyluronic acid; when A=CH$_2$OH, $n$=3, and B=CH$_2$OH, the compound is psicose, fructose, sorbose, or tagatose; when A=CH$_2$OH, $n$=3, and B=COOH, the compound is 5-ketohexanoic acid; when A=H, $n$=4, and B=CH$_2$OH, the compound is allose, altrose, glucose, mannose, gulose, idose, gallactose, or talose; when A=H, $n$=4, and B=COOH, the compound is a uronic acid; when A=CH$_2$OH, $n$=4, and B=CH$_2$OH, the compounds are heptoses; and when A=CH$_2$OH, $n$=4, and B=COOH, the compounds are 6-ketoheptanoic acids.

The utilizable oligosaccharides or compound sugars include disaccharides such as the pentose-hexose saccharides including glucoapiose, vicianose, and primeverose; the methylpentose-hexose saccharides including glycorhamnoside, and rutinose; and the dihexoses such as turanose, maltose, lactose, cellobiose, gentiobiose, melibiose, sucrose, and trehalose. Other compound sugars are represented by trisaccharides such as the methylpentosehexose saccharides including rhamminose, and robinose; the trihexose saccharides such as mannotriose, and the trihexoses including raffinose, melezitose, and gentianose. An example of a suitable tetrasaccharide is stachyose.

Various polysaccharides are also utilizable in the process of the present invention. These polysaccharides include pentosans such as araban, methylpentosans, such as fugosan, the hexosans, such as starch, cellulose, glycogen, inulin, mannan, galactan, lichenin, levan, dextran and laminarin. All of the above polysaccharides are composed of one type of sugar residue. Other polysaccharides which are composed of more than one type of sugar unit such as the pentosans, like araboxylan and the hexosans like galacto-mannan may be used. Other utilizable polysaccharides are represented by those composed of urosic acid units such as pectic acid and alginic acid, those composed of aldose (pentose or hexose) and uronic acid units such as gum arabic, damson gum, gum tragacanth, linseed mucilage, pectins, and those containing hexose units esterified with an inorganic acid such as certain seaweed polysaccharides like agar.

The hydrogen fluoride catalyst which is used in preparing the condensate may be used in anhydrous form or diluted with water to make a hydrofluoric acid of the desired concentration. The hydrofluoric acid may also be further diluted with various inert diluents when it is desirable to operate the process of this invention with low hydrogen fluoride concentrations. Suitable inert diluents include normal paraffinic hydrocarbons such as propane, n-butane, n-pentane, n-hexane, etc., and perfluoro derivatives of n-paraffinic hydrocarbons such as perfluoropropane, perfluoro-n-butane, perfluoro-n-pentane, perfluoro-n-hexane, etc. Other suitable diluents in these classes are apparent to one skilled in the art. For example, cycloparaffins as cyclopentane and cyclohexane may be used. In some instances, hydrofluoric acid of from about 85 to about 100% HF concentration is desirable, and in some other instances it is most desirable to use anhydrous hydrogen fluoride as the catalyst.

This process may be carried out by slowly adding a hydrogen fluoride catalyst to a stirred mixture of the hydrocarbon and carbohydrate or related material being subjected to reaction while maintaining the reaction temperature at from about −40° to about 100° C. By suitable cooling and/or heating means it is often advisable or desirable to commingle the reactants and catalyst at a relatively low temperature such as from about −80° to about −30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride catalyst is removed from the reaction mixture by distillation at atmospheric or lower pressures or by passing an inert gas through the reaction mixture while maintaining it at relatively low temperature. Also the entire reaction mixture and catalyst may be mixed with water or may be added to ice in order to quench the activity of the hydrogen fluoride catalyst and permit separation of the organic reaction products and unreacted starting materials from the catalyst. The organic reaction products may also be separated from aqueous hydrogen fluoride by means of an organic solvent such as ether in which some of the organic material may be dissolved. Further methods of isolating the reaction products are illustrated in the examples. Thus the product formed by reacting toluene with glucose or cellulose in the presence of substantially anhydrous hydrogen fluoride at 30° C. is separated into an ether soluble and water insoluble product and an ether insoluble and water-soluble product.

Thus, these materials are the oxyalkylated reaction products of carbohydrates including simple sugars, their derivatives, compound sugars, and polysaccharides with hydrocarbons such as isoparaffins, olefins, aromatics, naphthenes, terpenes, etc., using as a catalyst hydrogen fluoride. The type of product is markedly affected by the length of time that the reactants are in contact with the hydrogen fluoride catalyst as well as the temperature of reaction.

While hydrogen fluoride is the catalyst preferred for this process, the invention may also be carried out in some instances in the presence of other catalysts including catalysts of the Friedel-Crafts type, particularly aluminum chloride, as such or modified by addition thereto of an alcohol, ether, ester, nitroparaffin, alkyl halide, and the like. Mixtures of boron fluoride and hydrogen fluoride may also be employed. In some cases, fluoro acids are also active in this process, including fluorosulfonic acid, fluorophosphoric acids, hydroxyborofluoric acid and the like.

These hydrocarbon-carbohydrate condensates are known compounds and have been described in the following publications:

U.S. Patents 2,798,097, 2,798,098, 2,798,099, and 2,798,100; in Chemical and Engineering News, September 16, 1957; and in a paper presented by Carl B. Linn at the National Meeting of the American Chemical Society, Petroleum Division, New York city, September 8–13, 1957, entitled "The Catalyzed Condensation of Aromatic Compounds with Carbohydrates," a copy of which is available from Universal Oil Products Company. These patents and publications are by reference hereby incorporated in the present application.

OXYALKYLATED HYDROCARBON-CARBOHYDRATE CONDENSATES

The above described hydrocarbon-carbohydrate condensates can be oxyalkylated by any of the methods known to the art. They can be oxyalkylated, for example, with ethylene oxide, propylene oxide, butylene oxide, octylene oxide, and other members of the homologous series, epichlorohydrin, methylglycide, glycide, etc. Substituted alkylene oxides can also be employed, for example, styrene oxide, and the like. They can be oxyalkylated with mixed alkylene oxides to form random polyalkylene oxide moieties, AABABBAAAB, or they can be oxyalkylated to form block polyalkylene oxide moieties,

BBBAAABBBAAABBB wherein A is the unit derived from one alkylene oxide, for example, ethylene oxide, and B is the unit of a second alkylene oxide, for example, propylene oxide. These also include ter-polyalkylene oxide or higher moieties, where 3 or more alkylene oxides are reacted in a random or blockwise pattern.

Specifically, these condensates can be oxyalkylated in the manner heretofore employed in oxyalkylated sucrose as disclosed in U.S. Patent 2,652,394 except that unlike sucrose, which forms a slurry in a solvent such as xylene, the present condensates are generally soluble in xylene.

In view of the fact that oxyalkylation procedures are so well known, for the sake of brevity, particular attention is directed to the various U.S. patents which describe typical oxyalkylation procedure, for example, U.S. Patents 2,652,394, 2,792,371, 2,499,368 and the technical bulletin entitled "Ethylene Oxide" which has been distributed by the Jefferson Chemical Company of Houston, Texas. Note also the extensive bibliography in this bulletin and the large number of patents which deal with oxyalkylation procedure.

Depending on the particular application desired, one may combine a larger proportion or a smaller proportion of alkylene oxide to the condensate. Thus, the molar ratios of alkylene oxide to condensate can range, for example, from 1:1 weight ratios to ratios of from 1:200 more, but preferably 1:80. By proper control hydrophilic properies can be imparted to the condensate. As is well known, oxyalkylations are conducted under a wide variety of conditions, both at low and high pressure, at low and high temperature, in both the presence or absence of catalysts, solvents, etc. For instance, oxyalkylations can be carried out at temperatures of 70–200° C. and pressures of from 10–200 p.s.i. and times of from 15 minutes to several days. Preferably, oxyalkylations are carried out at 80–130° C. at 10–30 p.s.i.

Because of the polyfunctional ability of the oxyalkylation susceptible material cogeneric mixtures are formed rather than single chemical compounds. For example, the condensate formed from glucose,

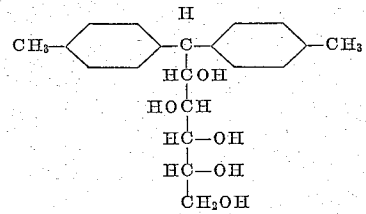

has five oxyalkylation susceptible OH groups. Furthermore, where the hydrocarbon has additional oxyalkylation susceptible groups, further permutations are introduced. Thus, where one oxyalkylates condensates such as

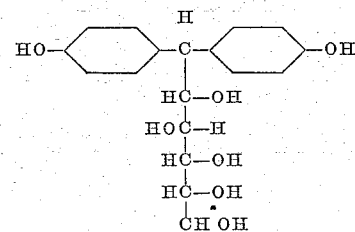

there are oxyalkylation-susceptible phenolic groups as well as the five oxyalkylation susceptible aliphatic OH groups. Where other oxyalkylation-susceptible groups are present in the molecule such as amino groups, carboxylate groups, etc., additional reaction centers are introduced. Since monofunctional alcohols are known to oxyalkylate statistically to form homologous compounds having an average degree of oxyalkylation, this factor would, of course, be mutiplied many times in the case of the polyfunctional compound of this invention. Thus, the compositions of this invention are cogeneric mixtures best described by the method of preparation.

The following examples are presented for purposes of illustration. For purposes of illustrating the invention the following two condensates are employed.

*Condensate I.*—1-deoxy-1, 1-di-(o-xylyl)-D-glucitol (made from o-xylene and starch).

*Condensate II.*—1-deoxy-1, 1-di-(p-hydroxyphenyl) D-glucitol (made from phenol and starch).

They will hereafter be referred to as "condensate I" and "condensate II."

Example 1

The reaction vessel employed is a stainless steel autoclave with the usual devices for heating, heat control, stirrer, inlet, outlet, etc., which is conventional in this type of apparatus. The capacity is approximately 4 liters. The stirrer is operated at a speed of approximately 250 r.p.m. There is charged into the autoclave 500 grams of condensate I, 300 grams of xylene, and 15 grams of sodium methylate. The autoclave is sealed, swept with nitrogen gas and stirring started immediately and heat applied. The temperature is allowed to rise to approximately 150° C. At this particular time the addition of propylene oxide is started. Propylene oxide is added continuously at such speed that it is absorbed by the reaction as added. The amount added in this operation is 1500 grams. The time required to add the propylene oxide is two hours. During this period the temperature is maintained at 138° to 150° C., using cooling water through the inner coils when necessary and otherwise applying heat if required. The maximum pressure during the reaction is 52 pounds per square inch. Ignoring the xylene and sodium methylate and considering only condensate I for convenience, the resultant product represents 3 parts by weight of propylene oxide to one part by weight of the condensate I. The xylene present represents approximately .6 part by weight.

Example 2

The reaction mass of Example 1 is transferred to a larger autoclave (capacity 15 liters). Without adding any more solvent or any more xylene the procedure is repeated so as to add another 1500 grams of propylene oxide under substantially the same operating conditions but requiring about 3¼ hours for the addition. At the end of this step the ratio represented approximately 6 to 1 (ratio propylene oxide to condensate I).

Example 3

In a third step, instead of adding 1500 grams of propylene oxide to the product of Example 1, 1625 grams are added. The reaction slows up and requires approximately 5¾ hours, using the same operating temperatures and pressures. The ratio at the end of the third step is 9.25 parts by weight of propylene oxide per weight of condensate I.

Example 4

At the end of the third step (Example 3) the autoclave is opened and an additional 5 grams of sodium methylate added, the autoclave flushed out as before, and the fourth and final oxyalkylation completed, using 1625 grams of propylene oxide, and the oxyalkylation is complete within 3½ hours using the same temperature range and pressure as previously. At the end of the reaction the product represents approximately 12.5 parts of propylene oxide by weight to one part of condensate I.

Having obtained oxpropylated condensates, the products are subjected to oxyethylation in a manner comparable to the oxyethylation of triethanolamines, or for that matter, in the same way that oxypropylated sucrose is subjected to oxyethylation in the manner described in U.S. Patent No. 2,652,394, dated September 15, 1953, to De Groote. Indeed, the procedure is comparatively simple for the reason that one is working with a liquid and also that ethylene oxide is more reactive than propylene oxide. As a result, using the same amount of catalyst one can oxyethylate more rapidly and usually at a lower pressure.

The same procedure using condensate I in xylene is employed in connection with ethylene oxide and the same mixture on a percentage basis is obtained as in the above examples where propylene oxide and condensate I are used. Similarly corresponding examples with condensate II are also carried out.

limits. In such instances, of course, the oxyalkylation may be described as random oxyalkylation insofar that one cannot determine the exact location of the propylene oxide or ethylene oxide groups. In such instances the procedure again is identically the same as previously described.

Actually, the condensate at times may contain a trace of moisture. Our preference is to prepare the mixture with an excess of xylene and distill off a part of the xylene so as to remove any trace of water and then flush out the mass with nitrogen. Even so, there may be a few tenths of a percent of moisture remain although at times examination indicates at the most it is merely a trace.

As previously pointed out the simplest procedure of all is to prepare a binary reaction product of ethylene oxide on the one hand or the condensate and propylene oxide on the other hand, and react with the other oxide. Note line CC—DD which indicates that in the binary reaction product obtained from the condensate and ethylene oxide one employs approximately 66.6% to 96.5% of ethylene oxide and approximately 3.5% to 33.4% of the condensate.

Similarly, if one refers to the line AA—BB it means one would employ from 1.95% of the condensate up to 14.3% of the condensate and from 85.7% of propylene oxide up to 98.05% of propylene oxide.

In other operations we proceed as follows: Mix the condensate with an aromatic petroleum solvent and with powdered caustic soda. Stir this mixture at 125° to 130° C. for a short period of time, approximately one-half hour, flush out with nitrogen, and then subject to vacuum so as to eliminate any moisture. Start to oxypropylate and continue until oxypropylation completes and then immediately follow with ethylene oxide. In these examples the amount of materials used is indicated in pounds and in each instance, of course, a suitable size autoclave is used. Although the oxyalkylation starts under vacuum the maximum pressure at any time is about 10 to 15 pounds. An efficient agitating device is used and stirring speed is approximately 350 r.p.m. These data covering nine oxyalkylations are included in Table I, immediately following. The time periods are shown. Incidentally, we can repeat these same operations using ethylene oxide first and then propylene oxide and we can also mix the two oxides and complete the same nine oxyalkylations under substantially the same conditions.

TABLE I

| Ex. No. | Condensate I | High boiling aromatic petroleum solvent, lbs. | Caustic soda, lbs. | Propylene oxide, lbs. | Ethylene oxide, lbs. | Time, hrs. | Temp., °C. | Maximum press., lbs. per sq. in. |
|---|---|---|---|---|---|---|---|---|
| 1a | 10.0 | 8.57 | 1.3 | 162.9 | 40.2 | 10.5 | 125–130 | 10–15 |
| 2a | 7.4 | 6.26 | 1.07 | 159.9 | 37.0 | 9.75 | 125–130 | 10–15 |
| 3a | 4.52 | 3.79 | .66 | 97.4 | 45.2 | 9.0 | 125–130 | 10–15 |
| 4a | 6.28 | 5.32 | 1.0 | 184.1 | 31.4 | 12.0 | 125–130 | 10–15 |
| 5a | 2.0 | 1.7 | .3 | 43.3 | 30.2 | 4.50 | 125–130 | 10–15 |
| 6a | 3.95 | 3.35 | .6 | 115.9 | 39.5 | 9.25 | 125–130 | 10–15 |
| 7a | 1.8 | 1.5 | .3 | 53.1 | 17.2 | 4.50 | 125–130 | 10–15 |
| 8a | 1.37 | 1.17 | .1 | 51.86 | 10.5 | 4.0 | 125–130 | 10–15 |
| 9a | 1.06 | .9 | .08 | 40.1 | 12.6 | 4.0 | 125–130 | 10–15 |

In the preceding procedures one oxide is added and then the other. One need not follow this procedure. The two oxides can be mixed together in suitable proportions and subsequently subjected to joint oxyalkylation so as to obtain products coming within the specified Referring again to the ratio of the initial reactants based on the trapezoid in attached drawing, we have calculated the percentage of the three initial reactants for the points A, B, C, D, E, and F, and Nos. 1 through 14, inclusive. We have also calculated initial binary mixtures corresponding in essence to the lines CC—DD and AA—BB, all of which appears in self-explanatory form in Table II, immediately following.

angles and a rectangle. The rectangle then obviously can be divided into three portions of the same size by drawing two additional lines, all of which is shown in the

TABLE II

| Points on boundary of area | Tertiary mixture, percent basis | | | Binary intermediate mixtures, percent basis | | | |
|---|---|---|---|---|---|---|---|
| | Condensate I | Propylene oxide | Ethylene oxide | Condensate I | Propylene oxide | Condensate I | Ethylene oxide |
| A | 1.75 | 88.25 | 10.0 | 1.95 | 98.05 | 14.90 | 85.1 |
| B | 1.75 | 50.0 | 48.25 | 3.38 | 96.62 | 3.5 | 96.5 |
| C | 5.0 | 75.0 | 20.0 | 6.24 | 93.76 | 20.0 | 80.0 |
| D | 5.0 | 55.0 | 40.0 | 8.32 | 91.68 | 11.1 | 88.9 |
| E | 10.0 | 70.0 | 20.0 | 12.5 | 87.5 | 33.4 | 66.6 |
| F | 10.0 | 60.0 | 30.0 | 14.3 | 85.7 | 25.0 | 75.0 |
| 1 | 4.72 | 76.4 | 18.88 | 5.8 | 94.2 | 20.0 | 80.0 |
| 2 | 3.62 | 78.3 | 18.15 | 4.42 | 95.58 | 13.1 | 86.9 |
| 3 | 3.07 | 66.3 | 30.63 | 4.43 | 95.57 | 9.1 | 90.97 |
| 4 | 2.84 | 83.0 | 14.16 | 3.51 | 96.49 | 16.7 | 83.3 |
| 5 | 2.66 | 57.5 | 39.84 | 4.42 | 95.58 | 6.25 | 93.75 |
| 6 | 2.48 | 72.6 | 24.92 | 3.3 | 96.7 | 9.04 | 90.96 |
| 7 | 2.21 | 64.7 | 33.09 | 3.3 | 96.7 | 6.26 | 93.74 |
| 8 | 2.16 | 81.5 | 16.54 | 2.58 | 97.42 | 11.55 | 88.45 |
| 9 | 1.97 | 74.5 | 23.53 | 2.58 | 97.42 | 7.73 | 92.2 |
| 10 | 4.0 | 61.0 | 35.0 | 6.17 | 93.83 | 10.28 | 89.72 |
| 11 | 1.8 | 83.0 | 16.0 | 2.12 | 97.88 | 10.1 | 89.9 |
| 12 | 7.0 | 70.0 | 23.0 | 9.1 | 89.9 | 23.35 | 76.65 |
| 13 | 8.0 | 57.0 | 35.0 | 12.3 | 87.7 | 18.6 | 81.4 |
| 14 | 9.0 | 65.0 | 26.0 | 12.15 | 87.85 | 25.7 | 74.3 |

As previously pointed out, the oxyalkylation process has been described in the literature and is described also in detail above. All one need do is employ such conventional oxyalkylation procedures to obtain products corresponding to the compositions as defined. Attention is again directed to the fact that one need not add the entire amount of either oxide at one time but that a small portion of one could be added and then another small portion of the other, and the process repeated.

For purpose of illustration we can prepare examples in three different ways corresponding to the compositions on the drawing. In the first series propylene oxide and ethylene oxide are mixed; this series is indicated as A*a*, B*a*, etc., through and including 14*a*; in the second series propylene oxide are first used followed by ethylene oxide and this series is indicated as A*b*, B*c*, etc., through and including 14*b*; and finally in a third series, ethylene oxide is used first followed by propylene oxide and this series is indicated as A*c*, B*c*, etc., through and including 14*c*. This relationship is shown in Table III.

TABLE III

| Composition corresponding to following point | Composition where oxides are mixed prior to oxyalkylation | Composition where propylene oxide used first followed by ethylene oxide | Composition where ethylene oxide used first followed by propylene oxide |
|---|---|---|---|
| A | Aa | Ab | Ac |
| B | Ba | Bb | Bc |
| C | Ca | Cb | Cc |
| D | Da | Db | Dc |
| E | Ea | Eb | Ec |
| F | Fa | Fb | Fc |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |

In a trapazoid such as A, B, D, C, the area can be divided conveniently into five portions by first drawing two lines from the shorter of the two parallel sides perpendicular so as to intersect the other longer parallel line in two places, thus dividing the trapezoid into two triangles and a rectangle. The rectangle then obviously can be divided into three portions of the same size by drawing two additional lines, all of which is shown in the drawing on a larger scale and in dotted lines only. In the hereto attached claims the area within the upper apex of the trapezoid refers to the area within such upper triangle; the area within the lower apex of the trapezoid refers to such lower triangle. The area in the center of the trapezoid refers to the area defined by the middle rectangle. The area of one rectangle is defined by being between the upper apex and the center rectangle, and the other by being between the lower apex and the center rectangle, all of which is perfectly plain by reference to the drawing. An attempt to draw additional lines and to number them in the same trapezoid, A, B, D, C, would only tend toward confusion and thus the present means is being employed to point out the various areas which in turn, appear in the sub-generic claims hereto appended. Thus, in the drawing, the area designated V corresponds to the area within the upper triangle the area W corresponds to the area within the lower triangle, the area X corresponds to that of the middle rectangle, and the areas Y and Z correspond to those of the other rectangles.

Although the condensates are oxybutylated in a manner similar to that described above, the following examples are presented to illustrate the oxybutylation of the condensates. In these examples ratio and condition approximating those shown above were employed except for the use of condensate II in place of condensate I.

*Example 1'*

The reaction vessel employed is a stainless steel autoclave with the usual devices for heating, heat control, stirrer, inlet, outlet, etc., which is conventional in this type of apparatus. The capacity is approximately 4 liters. The stirrer operates at a speed of approximately 250 r.p.m. There are charged into the autoclave 500 grams of condensate II, 300 grams of xylene and 15 grams of sodium methylate. The autoclave is sealed, swept with nitrogen gas and stirring started immediately and heat applied. The temperature is allowed to rise to approximately 155° C. At this particular time the addition of butylene oxide is started. The butylene oxide employed is a mixture of the straight chain isomers substantially free from isobutylene oxide. It is added continuously at such speed that it is absorbed by the reaction as added. The amount added in this operation is 1500 grams. The time required to add the butylene oxide is two hours.

During this period the temperature is maintained at 140° C. to 155° C., using cooling water through the inner coils when necessary and otherwise applying heat if required. The maximum pressure during the reaction is 48 pounds per square inch. Ignoring the xylene and sodium methylate and considering only the condensate II for convenience, the resultant product represents 3 parts by weight of butylene oxide to one part by weight of condensate II. The xylene present represents approximately .6 of one part by weight.

*Example 2'*

The reaction mass is transferred to a larger autoclave (capacity 15 liters). Without adding any more solvent or any more xylene the procedure is repeated so as to add another 1500 grams of butylene oxide under substantially the same operating conditions but requiring about 3 hours for the addition. At the end of this step the ratio represented approximately 6 to 1 (ratio butylene oxide to condensate II).

*Example 3'*

In a third step, instead of adding 1500 grams of butylene oxide, 1625 grams is added. The reaction slows up and requires approximately 6 hours, using the same operating temperatures and pressures. The ratio at the end of the third step is 9.25 parts by weight of butylene oxide per weight of condensate II.

*Example 4'*

At the end of the step the autoclave is opened and an additional 5 grams of sodium methylate added, the autoclave flushed out as before, and the fourth and final oxyalkylation completed, using 1625 grams of butylene oxide, and the oxyalkylation is complete within 3¼ hours using the same temperature range and pressure as previously. At the end of the reaction the product represents approximately 12.5 parts of butylene oxide by weight to one part of condensate II.

It is hardly necessary to point out that this oxybutylated condensate II is subjected to oxyethylation in the same manner described above in respect to the oxyalkylation of condensate I.

In light of what has been said previously, it is obvious that hardly any directions are required to produce the compounds herein specified. However, referring to the composition of the initial reactants based on the 5-sided figure in the attached FIG. II, it will be noted we have calculated the percentage of the three initial reactants for the points A',B',C',D',E',F',G',H',I' and J' which appear on the boundary of the 5-sided figure and also determine the five sub-divided parts of the 5-sided figure, two parts being triangles and the other being two parallelograms, and one tapezoid. Likewise we have calculated the composition for a number of examples within the area of the graph and corresponding points 1' to 18' inclusive. Note these data are included in Table IV immediately following:

TABLE IV

Figure 2:
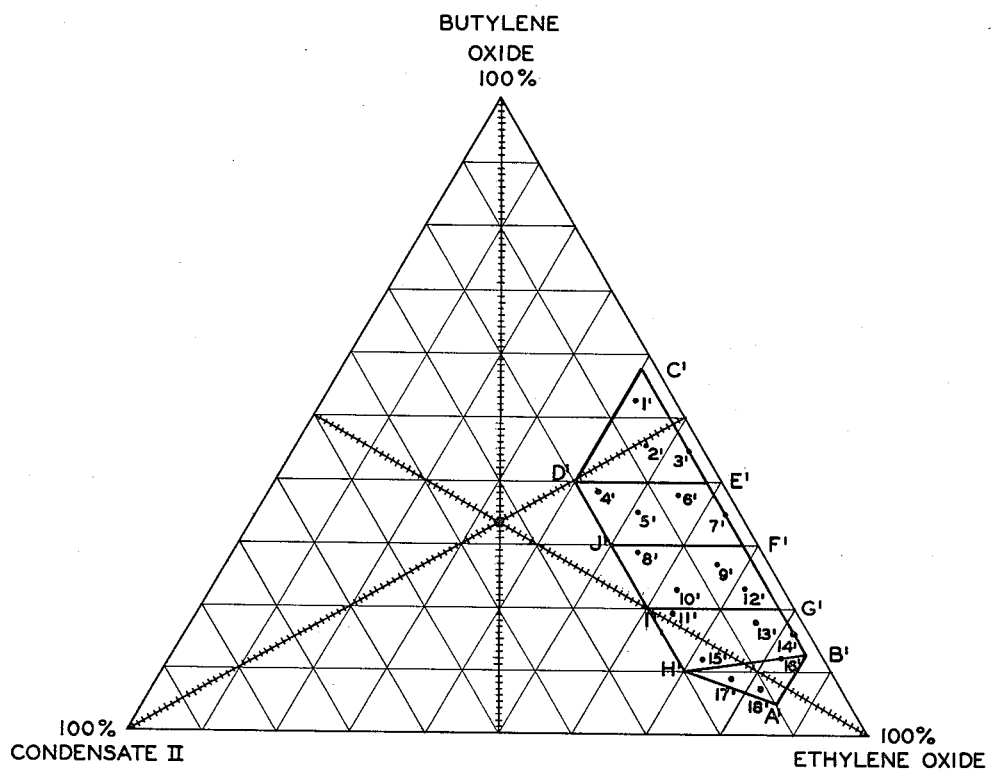

| Points on boundary of area, Fig. 2 | Tertiary mixture percent basis | | | Condensate II | Butylene oxide | Condensate II | Ethylene oxide |
|---|---|---|---|---|---|---|---|
| | Condensate II | Butylene oxide | Ethylene oxide | | | | |
| A' | 10.0 | 5.0 | 85.0 | 66.6 | 33.4 | 10.5 | 89.5 |
| B' | 1.5 | 13.5 | 85.0 | 10.0 | 90.0 | 1.7 | 98.3 |
| C' | 1.5 | 58.5 | 40.0 | 2.5 | 97.5 | 3.6 | 96.4 |
| D' | 20.0 | 40.0 | 40.0 | 33.4 | 66.6 | 33.4 | 66.6 |
| E' | 1.5 | 40.0 | 58.5 | 3.6 | 96.4 | 2.5 | 97.5 |
| F' | 1.5 | 30.0 | 68.5 | 4.75 | 95.25 | 2.14 | 97.86 |
| G' | 1.5 | 20.0 | 78.5 | 7.0 | 93.0 | 1.87 | 98.13 |
| H' | 20.0 | 10.0 | 70.0 | 66.6 | 33.4 | 22.2 | 77.8 |
| I' | 20.0 | 20.0 | 60.0 | 50.0 | 50.0 | 25.0 | 75.0 |
| J' | 20.0 | 30.0 | 50.0 | 40.0 | 60.0 | 28.6 | 71.4 |
| 1' | 5.0 | 52.5 | 42.5 | 8.68 | 91.32 | 10.5 | 89.5 |
| 2' | 8.0 | 44.0 | 48.0 | 15.4 | 84.5 | 14.3 | 85.7 |
| 3' | 1.5 | 54.5 | 44.0 | 2.68 | 97.32 | 3.3 | 96.7 |
| 4' | 18.0 | 36.5 | 45.5 | 33.0 | 67.0 | 28.3 | 71.7 |
| 5' | 15.0 | 33.5 | 51.5 | 31.0 | 69.0 | 22.6 | 77.4 |
| 6' | 7.5 | 36.5 | 56.0 | 17.1 | 82.9 | 11.8 | 88.2 |
| 7' | 1.5 | 34.5 | 64.0 | 4.16 | 95.84 | 2.3 | 97.7 |
| 8' | 17.0 | 28.0 | 55.0 | 37.7 | 62.3 | 23.6 | 76.4 |
| 9' | 7.0 | 26.0 | 67.0 | 21.2 | 78.8 | 9.5 | 90.5 |
| 10' | 13.5 | 22.5 | 64.0 | 37.5 | 62.5 | 17.4 | 82.6 |
| 11' | 15.5 | 19.0 | 65.5 | 44.8 | 55.2 | 19.2 | 80.8 |
| 12' | 4.5 | 23.0 | 72.5 | 16.35 | 83.65 | 5.85 | 94.15 |
| 13' | 6.0 | 17.0 | 77.0 | 26.1 | 73.9 | 7.2 | 92.8 |
| 14' | 1.5 | 17.0 | 81.5 | 8.1 | 91.9 | 1.8 | 98.2 |
| 15' | 16.0 | 12.5 | 71.5 | 56.2 | 43.8 | 18.3 | 81.7 |
| 16' | 4.5 | 13.0 | 82.5 | 25.7 | 74.3 | 5.2 | 94.8 |
| 17' | 13.5 | 9.0 | 77.5 | 60.0 | 40.0 | 14.8 | 85.2 |
| 18' | 11.5 | 7.0 | 81.5 | 62.1 | 37.9 | 12.35 | 87.65 |

Note the first column gives the particular point on the boundary of the 5-sided figure or within the 5-sided figure area. Note the next three column represent the tertiary mixture which corresponds to the initial reactants, to wit, the percentages, by weight, of condensate II, butylene oxide and ethylene oxide. Thus it is apparent that one could select any particular point and simply use the appropriate number of pounds of oxide; for instance, in regard to point A' all that would be necessary would be to mix 5 pounds of butylene oxide with 85 pounds of ethylene oxide and use the mixture to oxyalkylate 10 pounds of condensate II.

Similarly, in Example B', one need only mix 13.5 pounds of butylene oxide with 85 pounds of ethylene oxide and use the mixture to oxyalkylate 1.5 pounds of condensate II.

Note the fifth and sixth columns represent binary intermediate mixtures. For instance, in regard to the various points on the boundary and within the 5-sided figure area, we have calculated the initial mixture using condensate II and butylene oxide in the first case, and using condensate II and ethylene oxide in the second case, which would be employed for subsequent oxyalkylation to give the particular composition required. Note that a binary intermediate for the preparation of point A' can be prepared in any suitable manner involving 66.6 of condensate II and 33.4% of butylene oxide. Thus, for example, one could use 66.6 pounds of condensate II and 33.4 pounds of butylene oxide, or on a larger scale one could use 666 pounds of condensate II and 334 pounds of butylene oxide.

Referring now to the tertiary mixture table, it is apparent that for point A' condensate II and butylene oxide together represent 15%, and ethylene oxide 85%. Therefore, one could employ 15 pounds of the binary mixture and react it with 85 pounds of ethylene oxide.

Similarly, in regard to the fifth and sixth columns for point B′, the initial mixture involved condensate II and butylene oxide, representing 10% of condensate II and 90% of butylene oxide. If desired, 10 pounds of condensate II could be reacted with 90 pounds of butylene oxide. Such mixture need only be reacted with ethylene oxide by reacting 15 pounds of the mixture with 85 pounds of ethylene oxide. This is obvious from the data in regard to the tertiary mixtures.

Referring now to columns 7 and 8, it is obvious and could readily produce an oxyethylated condensate II and then subject it to reaction with butylene oxide. Using this procedure in regard to A′, it is obvious that the mixture represents 10.5% of condensate II and 89.5% of ethylene oxide. This product could be obtained from a binary mixture of 105 pounds of condensate II and 895 pounds of ethylene oxide.

Referring now to the tertiary mixture table, it is obvious that 95 pounds of such mixture could be reacted with 5 pounds of butylene oxide to give point A′. Similarly, in regard to point B′ the oxyethylated condensate II represents 1.7% of condensate II and 98.3% ethylene oxide. The mixture so obtained by referring to the tertiary mixture table would be reacted with butylene oxide in the proportion of 86.5 pounds of the mixture and 13.5 pounds of butylene oxide.

Purely for purpose of illustration, we have prepared examples three different ways corresponding to the compositions shown on the chart. In the first series the butylene oxides and ethylene oxide were mixed; this series is indicated as A′a, B′a, through and including 18′a; in the second series butylene oxide was first used followed by ethylene oxide and this series indicated as A′b, B′b, through and including 18′b; and finally in the third series ethylene oxide was used followed by butylene oxide and the series identified as A′c, B′c, through and including 18′c.

TABLE V

| Composition corresponding to following point on fig. 2 | Composition where oxides are mixed prior to oxyalkylation | Composition where butylene oxide used first followed by ethylene oxide | Composition where ethylene oxide used first followed by butylene oxide |
|---|---|---|---|
| A′ | A′a | A′b | A′c |
| B′ | B′a | B′b | B′c |
| C′ | C′a | C′b | C′c |
| D′ | D′a | D′b | D′c |
| E′ | E′a | E′b | E′c |
| F′ | F′a | F′b | F′c |
| G′ | G′a | G′b | G′c |
| H′ | H′a | H′b | H′c |
| I′ | I′a | I′b | I′c |
| J′ | J′a | J′b | J′c |
| 1′ | 1′a | 1′b | 1′c |
| 2′ | 2′a | 2′b | 2′c |
| 3′ | 3′a | 3′b | 3′c |
| 4′ | 4′a | 4′b | 4′c |
| 5′ | 5′a | 5′b | 5′c |
| 6′ | 6′a | 6′b | 6′c |
| 7′ | 7′a | 7′b | 7′c |
| 8′ | 8′a | 8′b | 8′c |
| 9′ | 9′a | 9′b | 9′c |
| 10′ | 10′a | 10′b | 10′c |
| 11′ | 11′a | 11′b | 11′c |
| 12′ | 12′a | 12′b | 12′c |
| 13′ | 13′a | 13′b | 13′c |
| 14′ | 14′a | 14′b | 14′c |
| 15′ | 15′a | 15′b | 15′c |
| 16′ | 16′a | 16′b | 16′c |
| 17′ | 17′a | 17′b | 17′c |
| 18′ | 18′a | 18′b | 18′c |

What has been said previously in regard to the temperatures used, and the amount of alkaline catalyst used applies generally to all examples. There is generally present an amount of solvent about equal to in weight or slightly less than the initial condensate. The final product is often diluted for convenience to give a 50% solution. The solvent is xylene or a high-boiling aromatic solvent or a mixture. Xylene is advantageously used when it is desired to vacuum distill the product so as to remove the solvent.

Previous reference has been made to the amount of alkaline catalyst used, whether dispersed metallic sodium caustic soda, sodium methoxide, caustic potash, etc. Caustic soda is satisfactory in all the herein described oxyalkylations. As has been noted previously, it is desirable to add all the required catalyst first, i.e., enough to carry through to the very end of the oxyalkylation. This is conventional procedure; for instance, see Table I of U.S. Patent No. 2,792,369, dated May 14, 1957, to Dickson. The concentration is usually 0.1–1% by weight based on the finished product. In the final stages the percentage of caustic soda present is, on a calculated basis, about 0.15%.

As has been previously noted, the pressures in all the compounds described generally come within the range of 10 to 75 pounds per square inch.

The products obtained when the xylene evaporates resemble sticky solids or viscous liquids and are generally straw colored or somewhat darker. In some instances, this discoloration is due to contact with air while still warm and in other instances due to the fact that the solvent, instead of xylene, is a high-boiling aromatic solvent which gives some residual color. In some instances, the alkalinity is removed by passing $CO_2$ through the mixture or adding enough acetic acid to neutralize the basic material left. No particular effort is made to preserve color although this could be done, for the reason that most of the uses herein described elsewhere attach no significance to color as such for use as demulsifiers for water-in-oil emulsions, as emulsifiers in cutting oils, etc.

In many instances, the alkali is not neutralized and the product obtained is subjected to oxyalkylation with another oxide as, for example, an oxyethylated derivative is then subjected to reaction with propylene oxide or butylene oxide, or, inversely, an oxypropylated or oxybutylated derivative is subjected to reaction with ethylene oxide. The preferred products and particularly from the standpoint of demulsification and for many other uses involve employment of both propylene oxide and ethylene oxide, or both butylene oxide and ethylene oxide.

Previous reference has been made to the use of butylene oxide alone or in combination with either propylene oxide or ethylene oxide or, for that matter, in combination with both propylene and ethylene oxide. It is not believed anything more need be said in regard to the use of butylene oxide in light of available data. For instance, note U.S. Patent 2,819,214, dated January 7, 1958, to De Groote et al. This is concerned with the oxyalkylation of tetramethylolcyclohexanol by use of butylene oxide and ethylene oxide in combination starting with either one of the oxides first. Oxybutylation can be conducted in the same manner as described in this patent with specific reference to Part Two, Section A. Our preference in regard to the use of butylene oxide is to use it as the initial stage, followed by oxyethylation or oxypropylation and oxyethylation. The amount preferably employed for such initial stage oxybutylation would be in the order of equal weight or possibly twice the weight of the initial condensate. In such initial oxyalkylation employing butylene oxide, our preference again is to use a fairly high temperature to start, for instance, 120–125° C., and then drop to approximately 95–100° C. as previously noted. Catalyst, temperature, time periods, etc., are about the same as previously.

Previous reference has been made to the use of glycide and for that matter methylglycide. Glycide (glycidol) is available from at least one source. Apparently, methylglycide is not available commercially at this time and must be prepared. Reference will be made exclusively to the use of glycide although methylglycide, if available, would be used in the same way. The advantage of the use of glycide is an increased branching effect. For instance, glycide can be reacted in the same manner as the other oxides employed, using for example one mole of glycide to the initial condensate, or two moles of glycide to the initial condensate. If the initial condensate has five hydroxyls, the first procedure would increase it to 6, and the second procedure would increase it to 7 hydroxyls.

Similarly, if one oxypropylates or oxybutylates first and then adds some ethylene oxide, it is sometimes advantageous toward the final stage of oxyethylation to add one mole of glycide for each initial hydroxyl, for instance, 3, 4, 5, 6 or 7 moles as the case may be, and then proceed with further oxyethylation. The probable result is increased branching which is of value in some instances.

BREAKING WATER-IN-OIL EMULSIONS

The oxyalkylated products of the present invention can be employed in preventing breaking or resolving emulsions of the water-in-oil type, and particularly petroleum emulsions. Their use provides an economical and rapid process for resolving petroleum emulsions of the water-in-oil type, that are commonly referred to as "cut oil," "roily oil," "emulsified oil," etc., and which comprise fine droplets of naturally-occurring waters.

One of the more advantageous aspects, of the present invention, is concerned with a process for breaking petroleum emulsions employing a demulsifier containing an oxyalkylated condensate which is derived from the condensate, propylene oxide and ethylene oxide in such weight proportions so the average composition stated in terms of initial reactants lies approximately within the trapezoid of the accompanying drawing in which the minimum condensate content is at least 1.75% and which trapezoid is identified by the fact that its area lies within the straight lines connecting A, B, F, E. Our preference by far is to use the compositions which represent less than one-half of this total area, to wit, the smaller trapezoid A, B, D, C.

In another of its advantageous aspects, the present invention is concerned with a process for breaking petroleum emulsions, employing a demulsifier containing an oxyalkylated condensate. More specifically, said condensate is derived from carbohydrate condensates, ethylene oxide and butylene oxide in said weight proportions so that the average composition stated in terms of initial reactants lies approximately within the 5-sided figure of the accompanying FIG. II in which the minimum condensate content is at least 1.75% and which 5-sided figure is identified by the fact that its area lies within the straight lines connecting A', B', C', D' and H'.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component.

These demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., are often employed as diluents. Miscellaneous solvents, such as pine oil, carbon tetrachloride, sulfur dioxide extract obtained in the refining of petroleum, etc., are often employed as diluents. Similarly, the material or materials employed as the demulsifying agent of or process are often admixed with one or more of the solvents customarily used in connection with conventional demulsifying agents. Moreover, said material or materials are often used alone or in admixture with other suitable well-known classes of demulsifying agents.

These demulsifying agents are useful in a water-soluble form, or in an oil-soluble form, or in a form exhibiting both oil and water-solubility. Sometimes they are used in a form which exhibits relatively limited oil-solubility. However, since such reagents are frequently used in a ratio of 1 to 10,000, or 1 to 20,000, or 1 to 30,000, or even 1 to 40,000, or 1 to 50,000, as in desalting practice, such an apparent insolubility in oil and water is not significant, because said reagents undoubtedly have solubility within such concentrations.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example, by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e.g. the bottom of the tank, and re-introduces it into the top of the tank, the demulsifier being added, for example, at the suction side of said circulating pump.

In second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixture of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the desirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000 or the like.

In many instances the oxyalkylated products herein specified as demulsifiers can be conveniently used without dilution. However, as previously noted, they may be diluted as desired with any suitable solvent. Selection of the solvent will vary, depending upon the solubility characteristics of the oxyalkylated product, and, of course, will be dictated in part by economic consideration, i.e. cost.

The products herein described are useful not only alone but also admixed with some other chemical demulsifier.

In recent years pipeline standards for oils have been raised so that an effective demulsifier must not only be able to break oil field emulsions under conventional conditional conditions without sludge, but a the same time it must also yield bright pipeline oil, i.e. pipeline oil that is free from minute traces of foreign matter, whether suspended water or suspended emulsion droplets due to nonresolvable solids. In addition, the water phase should be free of oil so as not to create a disposal problem. Thus, it is presently desirable to use a demulsifier that produces absolutely bright, haze-free oil in the top layer, yields little or no interphasal sludge, and has little, if any, oil in the water phase.

For the purpose of resolving petroleum emulsions of the water-in-oil type, we prefer to employ those oxyalkylated condensates, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test, simply means that the preferred product for demulsification is soluble in a solvent having hydrophobe properties or in an oxygenated water insoluble solvent, or even in a mixture containing a fraction of a water-soluble oxygenated hydrocarbon solvent and that when shaken with water the product may remain in the non-aqueous solvent or, for that matter, it may pass into the aqueous solvent. In other words, although it is xylene soluble for example, it may also be water soluble to an equal or greater degree.

*Examples*

The compounds listed in the following table are used to break water-in-oil emulsion. The method employed is the Bottle Test described in "Treating Oil Field Emulsion," 2nd Edition, published by Petroleum Extension Service, et al., (1955), pp. 40–44.

The effectiveness of the present demulsifiers is based on their ability to break oil field emulsion under conventional conditions without sludge and at the same time yield bright pipeline oil, i.e., pipeline oil that is free from the minute traces of foreign matter, whether suspended water of suspended emulsion droplets due to nonresolvable solids. A clear break is obtained. The compounds shown in Table VI are particularly effective.

TABLE VI

The following compounds are particularly effective:

| | | |
|---|---|---|
| 1a | 8a | 8'b |
| 2b | 9a | 9'b |
| 3b | 10b | 10'c |
| 4a | 10c | 11'b |
| Ea | 12b | 12'b |
| Fb | 14b | 13'b |
| 5b | 2'c | 15'a |
| 6b | 4'a | 16'b |
| 7b | 5'a | 17'a |

OTHER USES AND DERIVATIVES

In addition, the compounds of this invention or derivatives thereof, such as the acylated derivatives, etc., are useful as detergents, common solvents, emulsifiers, and the like. They may be used as emulsifying agents to emulsify or remove greases or dirt; they may be used in the manufacture of a variety of other materials such as soluble oils, insecticidal sprays, etc.

These materials are valuable as fuel oil additives and particularly when combined with a compound which has one or more basic nitrogen atoms, for instance, these compounds are particularly effective as fuel oil additives in combination with a glyoxalidine or aminoglyoxalidine.

An analogous use in which these products are equally satisfactory is that described in U.S. Patent No. 2,665,978, dated January 12, 1954, to Stayner et al. The amount employed in the same proportion or lesser amounts than referred to in U.S. Patent No. 2,553,183, dated May 15, 1951, to Caron et al.

Another use is for the purpose of inhibiting fogs in hydrocarbon products as described in U.S. Patents 2,550,981 and 2,550,982, both dated May 1, 1951 and both to Eberz. Here again, it can be used in the same proportions as herein indicated or even smaller proportions.

An additional use is where the products do not serve as an emulsifying agent alone but serve as an adjunct. Briefly stated, this last use is concerned with a coupling agent to be employed with various emulsifying agents of the kind which already appear on the market with particular reference to the fatty acid esters of oxyethylated sorbitol, sucrose, glycorol, etc. As to the use of the products herein described see "The Composition and Structure of Technical Emulsions," J. H. Goodey, Royal Australian Chemical Institute Journal and Prox., vol. 16, 1949, pp. 47–75. As stated, in the summary of the article it states:

"The technical oil-in-water emulsion is regarded as a system of four components; the dispersion medium consisting of the highly polar substance water; the disperse phase composed of hydrocarbons or other substances of comparatively weak polarity; the coupling agent, being an oil-soluble substance involving an hydroxyl, carboxyl or similar polar group; and the emulsifying agent which is a water-soluble substance involving an hydrocarbon radical attached to an ionizable group."

Thus, these peculiar products giving curdy precipitates with water are unusually effective as coupling agents in many instances.

These materials have particular utility in increasing the yield of an oil well by various procedures which, in essence, involve the use of fracturing of the strata by means of liquid pressure. A mixture of these products with oil or oil in combination with a gel former alone, or a gel former and finely divided mineral particles, yields a product which, when it reaches crevices in the strata which are yielding water, forms a gelatinous mass of curdy precipitate or solid or semi-solid emulsion of a high viscosity. In any event, it represents a rapid sealing agent for the strate crevices and permits pressure to be applied to fracture the strata without loss of fluid through crevices, openings or the like.

The herein described products and the derivatives thereof are particularly valuable in flooding processes for recovery of oil from subterranean oil-bearing strata when employed in the manner described in U.S. Patent 2,233,381 dated February 25, 1941, to De Groote and Keiser.

The products herein described are particularly effective as emulsifiers or surfactants in the preparation of drilling mud of both the aqueous type and the emulsified type. The latter type of drilling mud contains a substantial amount of hydrocarbon oil as a base and this type is sometimes referred to as oil base drilling mud.

The herein described products may be used for the resolution of oil-in-water emulsions and particularly in instances where such emulsions contain small amounts of oil, as, for example, one-tenth of one percent or less. As a particular procedure of use one may follow what is described in U.S. Patent No. 2,759,607, dated August 21, 1956, to Boyd et al., or the procedure described in U.S. Patent No. 2,589,201, dated March 11, 1952, to Monson.

The compounds of the kind herein described may be used for the resolution of emulsions of the oil-in-water type as described in said patent to Monson.

These products may be reacted with alkylene imines, such as ethylene imine or propylene imine, to produce cation-active materials. Instead of an imine, one may employ what is a somewhat equivalent material, to wit, a dialkylaminoepoxypropane of the structure

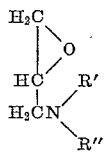

wherein R′ and R″ are alkyl groups.

The products may be combined with carboxy acids, such as higher fatty acids, so as to change their characteristics or with polycarboxy acids, such is diglycolic, maleic acid, phthalic acid, succinic acid, and the like, to give resins, soft polymers, or fractional esters which are essentially monomeric. Such products and others herein described may all be used for the resolution of petroleum emulsions of the water-in-oil type. The products without further reaction are particularly valuable as additives for lubricating oils which are derived from sources other than petroleum.

Compounds of the kind herein described can be modified in regard to the hydrophobe-hydrophile balance by reaction with epoxides having 8 or more carbon atoms as, for example, the alpha-beta epoxides derived from octene, dodecene, octadacene, etc. Furthermore, they can be reacted with epoxidized fatty acids, or esters thereof, such as epoxidized butylsoyate, i.e., a butyl ester which has been derived from soya fatty acid and then reacted with a peroxide so as to introduce an epoxy ring.

The products may be reacted with acrylonitrile or the like and subsequently converted by the conventional procedure into the ammonium salt of the corresponding carboxy acid. The ammonium salt may be used as such or the free carboxy acid liberated.

Products of this kind may be subjected to sulfation or sulfonation as, for example, reaction with sulfamic acid, to wit, and ammonium salt of the corresponding sulfate.

Indeed where the products have been reacted so as to introduce one or more basic nitrogen atoms as, for example, with ethylene imine or the like, such derivatives having basic nitrogen groups are effective as corrosion inhibitors and particularly for use in connection with the petroleum industry as noted in Blair and Gross Reissue Patent No. 23,227 dated May 9, 1950.

Having thus described our invention, what we claim as new and desire to obtain by Letters Patent is

1. A process of breaking a petroleum emulsion of the water-in-oil type characterized by subjecting said emulsion to a demulsifying agent containing an oxyalkylated xylene-carbohydrate condensate, said condensate of xylene and carbohydrate being prepared by reacting xylene with said carbohydrate at about $-40°$ C. to about $150°$ C. in the presence of hydrogen fluoride.

2. A process of breaking a petroleum emulsion of the water-in-oil type characterized by subjecting said emulsion to a demulsifying agent containing an oxyalkylated phenol-carbohydrate condensate, said condensate of phenol and carbohydrate being prepared by reacting phenol with said carbohydrate at about $-40°$ C. to about $150°$ C. in the presence of hydrogen fluoride.

3. A process of breaking a petroleum emulsion of the water-in-oil type characterized by subjecting said emulsion to a demulsifying agent containing oxyalkylated 1-deoxy-1,1-di-(o-xyly)-D-glucitol.

4. A process of breaking a petroleum emulsion of the water-in-oil type characterized by subjecting said emulsion to a demulsifying agent containing oxyalkylated 1-deoxy-1,1-di(p-hydroxyphenyl) D-glucitol.

5. A process of breaking a petroleum emulsion of the water-in-oil type characterized by subjecting said emulsion to a demulsifying agent containing an oxyalkylated condensate of a carbohydrate and xylene, said oxyalkylated condensate being prepared by reacting said carbohydrate with xylene at about $-40°$ C. to about $150°$ C. in the presence of hydrogen fluoride and propylene and ethylene oxides, the average composition of said oxyalkylated carbohydrate-xylene condensate in terms of initial reactants on a weight basis having a minimum carbohydrate-xylene condensate content of at least 1.75% and lying within the straight lines of A, B, F, E of FIGURE 1.

6. A process of breaking a petroleum emulsion of the water-in-oil type characterized by subjecting said emulsion to a demulsifying agent containing an oxyalkylated condensate of a carbohydrate and phenol, said oxyalkylated condensate being prepared by reacting said carbohydrate with phenol at about $-40°$ C. to about $150°$ C. in the presence of hydrogen fluoride and propylene and ethylene oxides, the average composition of said oxyalkylated carbohydrate-phenol condensate in terms of initial reactants on a weight basis having a minimum carbohydrate-phenol condensate content of at least 1.75% and lying within the straight lines of A, B, F, E of FIGURE 1.

References Cited by the Examiner

UNITED STATES PATENTS

| | | | |
|---|---|---|---|
| 2,602,051 | 7/52 | De Groote | 252—331 |
| 2,798,079 | 7/57 | Linn | 260—210 XR |
| 2,798,099 | 7/57 | Linn | 260—210 XR |
| 2,819,215 | 1/58 | De Groote et al. | 252—331 |
| 2,909,539 | 10/59 | Linn | 260—618 |
| 2,926,177 | 2/60 | Linn | 260—210 XR |
| 2,944,980 | 7/60 | De Groote et al. | 252—331 |

JULIUS GREENWALD, *Primary Examiner.*

JOSEPH R. LIEBERMAN, ALBERT T. MEYERS, *Examiners.*